(12) United States Patent
Seo et al.

(10) Patent No.: US 11,830,248 B2
(45) Date of Patent: *Nov. 28, 2023

(54) METHOD AND APPARATUS FOR PROCESSING HYPERSPECTRAL DATA FOR IDENTIFYING MARINE OBJECT

(71) Applicant: KOREA INSTITUTE OF OCEAN SCIENCE & TECHNOLOGY, Busan (KR)

(72) Inventors: Dongmin Seo, Seoul (KR); Sangwoo Oh, Sejong-si (KR)

(73) Assignee: KOREA INSTITUTE OF OCEAN SCIENCE & TECHNOLOGY, Busan (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/999,202

(22) PCT Filed: Aug. 24, 2021

(86) PCT No.: PCT/KR2021/011285
§ 371 (c)(1),
(2) Date: Nov. 17, 2022

(87) PCT Pub. No.: WO2022/139110
PCT Pub. Date: Jun. 30, 2022

(65) Prior Publication Data
US 2023/0196763 A1   Jun. 22, 2023

(30) Foreign Application Priority Data
Dec. 24, 2020 (KR) .................. 10-2020-0182912

(51) Int. Cl.
*G06V 20/10* (2022.01)
*G06V 10/762* (2022.01)
(Continued)

(52) U.S. Cl.
CPC .......... *G06V 20/194* (2022.01); *G06V 10/762* (2022.01); *G06V 10/764* (2022.01); *G06V 10/774* (2022.01)

(58) Field of Classification Search
CPC .... G06V 10/774; G06V 10/26; G06V 10/273; G06V 10/56; G06V 10/764
See application file for complete search history.

(56) References Cited

U.S. PATENT DOCUMENTS

2016/0266246 A1   9/2016 Hjelmstad
2019/0293489 A1*  9/2019 Oh .................. G06V 10/40

FOREIGN PATENT DOCUMENTS

CN   102708354 B * 11/2017
KR   10-1621354 B1   5/2016
(Continued)

OTHER PUBLICATIONS

Martin Ester, Hans-Peter Kriegel, Jörg Sander, and Xiaowei Xu, "A density-based algorithm for discovering clusters in large spatial databases with noise." In Proceedings of the Second International Conference on Knowledge Discovery and Data Mining (KDD'96). AAAI Press, 226-231. (Year: 1996).*

(Continued)

*Primary Examiner* — Ross Varndell
(74) *Attorney, Agent, or Firm* — Lewis Roca Rothgerber Christie LLP

(57) ABSTRACT

Disclosed is a method for processing hyperspectral data for identifying a marine object including configuring a learning dataset for identifying a marine object using hyperspectral data; analyzing the dataset using an analysis algorithm; managing pixels constituting the object using the analysis result; and constructing learning data using pixel data. According to the present invention, according to the accumulation of the hyperspectral data, it is possible to learn and relearn a hyperspectral data-based marine object recognition (Continued)

model that recognizes marine objects shown as noise in machine learning clustering.

8 Claims, 14 Drawing Sheets

(51) Int. Cl.
*G06V 10/774* (2022.01)
*G06V 10/764* (2022.01)

(56) References Cited

FOREIGN PATENT DOCUMENTS

| KR | 10-1672291 B1 | 11/2016 |
| KR | 10-2018-0065411 A | 6/2018 |
| KR | 10-2258903 B1 | 6/2021 |
| KR | 10-2270834 B1 | 6/2021 |

OTHER PUBLICATIONS

J. M. Murphy and M. Maggioni, "Unsupervised Clustering and Active Learning of Hyperspectral Images With Nonlinear Diffusion," in IEEE Transactions on Geoscience and Remote Sensing, vol. 57, No. 3, pp. 1829-1845, Mar. 2019, doi: 10.1109/TGRS.2018.2869723. (Year: 2019).*

Seo et al., "Maritime object detection and learning data construction using DSCAN," Autumn Conference of the Korean Society of Marine Environment & Safety 2020, Nov. 26, 2020, pp. 1-10 (Year: 2020).*

International Search Report for International Application No. PCT/KR2021/011287, dated Dec. 15, 2021 and English Translation, 7 pages.

International Search Report of PCT/KR2021/011285, dated Dec. 21, 2021, 6 pages.

Noh, et al., "A study on Learning Medical Image Dataset and Analysis for Deep Learning", Proceedings of Annual Spring Conference of KIPS 2018, vol. 25. No. 1, May 2018, pp. 350-351.

Lee, "A Method of Color Image Segmentation based on DBSCAN Using Compactness of Superpixels and Texture Information", Journal of the Korea Society of Digital Industry and Information Management, vol. 11, No. 4, Dec. 201, pp. 89-97.

Suh, "Maritime object detection and learning data construction using DSCAN", Autumn Conference of the Korean Society of Marine Environment & Safety 2020, Nov. 26, 2020, pp. 1-10.

* cited by examiner

METHOD AND APPARATUS FOR PROCESSING HYPERSPECTRAL DATA FOR IDENTIFYING MARINE OBJECT

CROSS-REFERENCE TO RELATED APPLICATION(S)

This application is a U.S. National Phase Patent Application of PCT/KR2021/011285, filed Aug. 24, 2021, which claims priority to Korean patent application 10-2020-0182912, filed on Dec. 24, 2020, the entire content of each of which is hereby incorporated by reference.

TECHNICAL FIELD

The present invention relates to a method and an apparatus for processing hyperspectral data for identifying a marine object, and more particularly, to a method for generating learning data using hyperspectral data to identify a marine object based on artificial intelligence and an apparatus using the same.

BACKGROUND ART

According to the related art, there has been provided a method for detecting accidental vessels and drowning persons using an aerial hyperspectral image capable of supporting a rapid search work of accident vessels and missing persons due to marine accidents by using a hyperspectral to improve optimized identification ability according to various search objects and improving the degree of discrimination through the results of a reflected light spectrum analysis test for each object.

In the related art, observation information, and location information and reflectivity values for each pixel of the detected accidental vessel and drowning person are extracted, the similarity of the spectral characteristics between the spectral reflectivity value and an observed reflectivity value of a target material is analyzed using library information that has already been built, and constituent materials and occupancy ratios for each pixel of the hyperspectral image are extracted and detected, so that the detection efficiency may be deteriorated. Therefore, the related art is not used for large-scale search and detection. In addition, it was not easy to expand the spectral library by only comparing the similarity with the actually measured spectral library.

According to the related art, a technique for detecting a whitening event using an aerial hyperspectral image has been disclosed. A technology disclosed in Korean Patent Registration No. 10-1672291 relates to a method for detecting a whitening event using an aerial hyperspectral image, and it is necessary to prepare in advance an image library about a whitening event to be compared with a photographed hyperspectral image. However, there is a problem in that when the image library is generated once, it is difficult to be extended, it takes a lot of time to configure a huge library, and it takes a lot of load to take the huge library.

DISCLOSURE

Technical Problem

An object to be solved by the present invention is to provide a method required for using an artificial intelligence model to identify a marine object by contrasting actual measurement data and library data in the related art and an apparatus using the same.

Another object to be solved by the present invention is to provide a method for generating a dataset required for leaning of identifying a marine object in an artificial intelligence model and an apparatus using the same.

Yet another object to be solved by the present invention is to provide a method for processing hyperspectral data using artificial intelligence-based clustering and an apparatus using the same.

Technical Solution

An aspect of the present invention provide a method for processing hyperspectral data including configuring a learning dataset for identifying a marine object using hyperspectral data; analyzing the dataset using an analysis algorithm; managing pixels constituting the object using the analysis result; and constructing learning data using pixel data.

The method for processing hyperspectral data may further include collecting hyperspectral data through marine photographing in which various objects to be used for learning an object identification model are shown.

The method for processing hyperspectral data may further include preprocessing the hyperspectral data.

The configuring of the dataset may be configured to include selecting a data file, setting an analysis range of the data file, and converting the data file.

The analyzing of the dataset may be configured to include pre-screening hyperspectral data using a machine learning algorithm; detecting a marine object based on the pre-screening result; and identifying the detected marine object.

The pre-screening may be configured to include analyzing the density of a cluster while changing parameters for the formation of the marine object cluster.

The detecting of the marine object may be configured to include removing data of a seawater area from the hyperspectral data based on the density of the marine object.

The identifying of the marine object may be configured to further include detecting noise formed by an object out of the cluster using a clustering algorithm.

The identifying of the marine object may be configured to include identifying the marine object based on coordinate values and a spectrum of pixels corresponding to the noise.

The managing of the pixels may be configured to include labeling pixels formed by the marine object.

In addition, the constructing of the learning data may be configured to include classifying pixel data formed by the labeled marine object; and constructing an integrated library using the classified pixel data.

The constructing of the learning data may be configured to include storing a pixel spectrum in the integrated library.

The method for processing hyperspectral data may further include visualizing the hyperspectral data as an image using the data in a visual light area included in the hyperspectral data.

The analyzing of the dataset may be configured to include analyzing a detection rate of the marine object according to a change in parameter for the formation of a marine object cluster.

Another aspect of the present invention provide an apparatus for processing hyperspectral data including a dataset configuration unit for configuring a learning dataset for identifying a marine object using hyperspectral data; a data analysis unit for analyzing the dataset using an analysis algorithm; a pixel management unit for managing pixels constituting the object using the analysis result; and a learning data generation unit for constructing the learning data using pixel data.

The specific details of other embodiments are included in the "the detailed description of the invention" and the accompanying "drawings".

Advantages and/or features of the present invention, and a method for achieving the advantages and/or features will become obvious with reference to embodiments to be described below in detail together with the accompanying drawings.

However, the present invention is not limited only to a configuration of each embodiment to be disclosed below, but may also be implemented in various different forms. The respective embodiments disclosed in this specification are provided only to complete disclosure of the present invention and to fully provide those skilled in the art to which the present invention pertains with the category of the invention, and the present invention will be defined only by the scope of each claim of the claims.

Advantageous Effects

According to the present invention, it is possible to train a learning model for identifying marine objects based on hyperspectral data using the constructed learning data.

In addition, it is possible to reduce the time required for identifying marine objects compared to seawater by using hyperspectral data, and also increase an identification rate.

In addition, according to the accumulation of the hyperspectral data, it is possible to learn and relearn a hyperspectral data-based marine object recognition model that recognizes marine objects shown as noise in machine learning clustering.

BEST MODE FOR THE INVENTION

Figure 1:
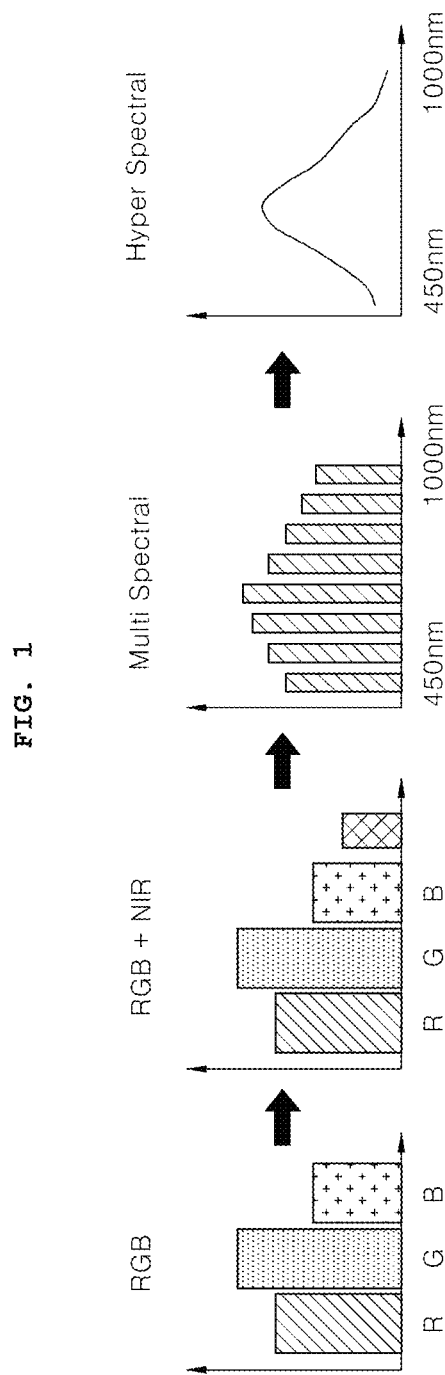
FIG. 1 is an exemplary diagram for describing hyperspectral data according to an embodiment of the present invention.

The present invention provides a method required for using an artificial intelligence model to identify a marine object by contrasting actual measurement data and library data in the related art and an apparatus using the same.

[Modes for the Invention]

Before describing the present invention in detail, terms or words used in this specification should not be construed as unconditionally limited to a conventional or dictionary meaning, and the inventors of the present invention can appropriately define and use the concept of various terms in order to describe their invention in the best method. Furthermore, it should be understood that these terms or words should be interpreted as meanings and concepts consistent with the technical idea of the present invention.

That is, the terms used in the present invention are only used to describe a preferred embodiment of the present invention, and are not intended to specifically limit the contents of the present invention, and it should be noted that these terms are terms defined in consideration with various possibilities of the present invention.

In addition, in this specification, it should be understood that the singular expression may include a plural expression unless clearly indicated in another meaning in the context, and even if similarly expressed in the plural, the singular expression may include the meaning of the singular number.

Throughout the present invention, when a component is described as "including" the other component, the component does not exclude any other component, but may further include any other component unless otherwise indicated in contrary.

Furthermore, when it is described that a component is "inserted or connected into" the other component, this component may be directly connected or in contact with the other component, and may be spaced apart from the other component at a predetermined distance. In addition, when a component is spaced apart from the other component at a predetermined distance, a third component or means may exist to fix and connect the corresponding component to the other component and the description of the third component or means may also be omitted.

On the contrary, when it is described that a component is "directly connected to" or "directly accesses" the other component, it should be understood that a third component or means does not exist.

Similarly, other expressions describing a relationship between components, that is, expressions such as "between" and "directly between" or "adjacent to" and "directly adjacent to" should be similarly interpreted.

In addition, in the specification, the terms such as "one surface", "the other surface", "one side", "the other side", "first", "second", etc., are used to clearly distinguish one component from the other component with respect to one component.

In addition, in this specification, it should be understood that terms related to positions such as "upper", "lower", "left", and "right" are used to indicate relative positions with respect to the corresponding component in the drawing, and unless an absolute position is specified with respect to their positions, these position-related terms should not be construed as referring to an absolute position.

In addition, in this specification, in specifying the reference numerals for each component in each drawing, like reference numerals indicate like components throughout the specification, so that the same components has the same reference number even if it is shown in different drawings.

In the drawings appended to this specification, a size, a position, a coupling relationship, etc. of each component constituting the present invention may be described while being partially exaggerated, reduced, or omitted for sufficiently clearly delivering the spirit of the present invention or for the convenience of description, and thus, the proportion or scale thereof may not be exact.

Further, hereinafter, in the following description of the present invention, a detailed description of a configuration determined to unnecessarily obscure the subject matter of the present invention, for example, a known technology including the related art may also be omitted.

Hereinafter, embodiments of the present invention will be described in detail with reference to the related drawings.

FIG. 1 is an exemplary diagram for describing hyperspectral data according to an embodiment of the present invention.

Referring to FIG. 1, examples of data that may be collected using various image sensors are shown. An image sensor included in a general camera describes an appearance of an object by using RGB data based on visible light among various areas of light according to a wavelength. A near-infrared (NIR) sensor may additionally generate NIR data based on near-infrared rays in addition to the RGB data. In addition, there may be an image sensor that generates multiple data based on multi-spectral, for example, light having a wavelength in a certain range of 450 nm to 1000 nm as illustrated in FIG. 1.

The hyperspectral data according to the embodiment of the present invention is characterized as, for example, sensing data generated based on light having a wavelength in a continuous range of 450 nm to 1000 nm.

The hyperspectral data according to the embodiment of the present invention may be collected through a vehicle such as an airplane, a drone, or a helicopter using a camera mounted with a hyperspectral image sensor, but it is not limited thereto, it is not excluded that the hyperspectral data may be collected in a wider range of space, that is, by artificial satellites.

In the range of a subject of the hyperspectral data according to the embodiment of the present invention, the land as well as the ocean may be included. Accordingly, various aspects of the embodiment of the present invention may be applied to object identification based on images photographed from a subject and a remote location without distinguishing the sea and land.

Figure 2:
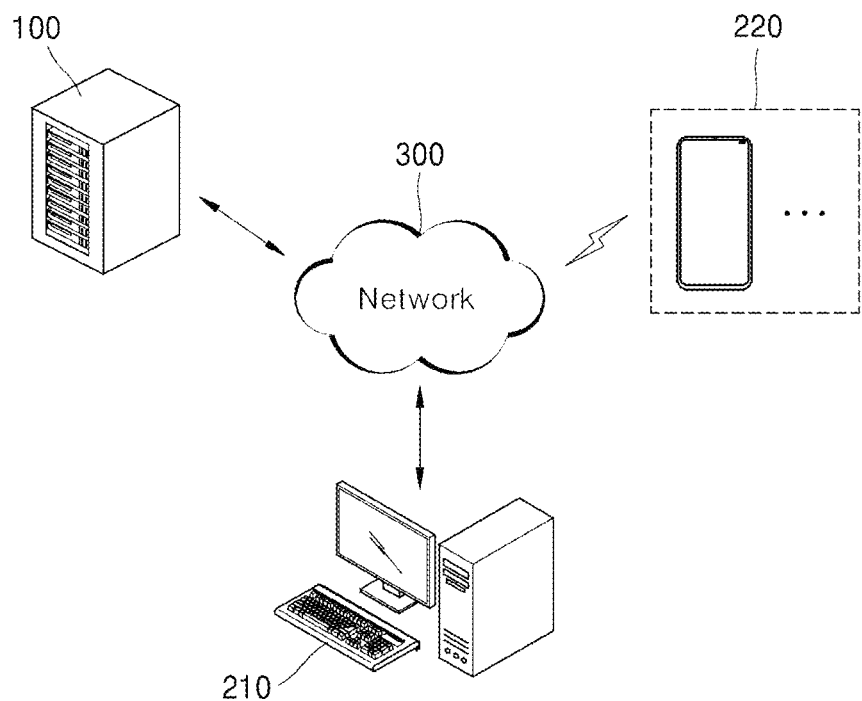
FIG. 2 is a network relationship diagram of a server and a client model of an apparatus for processing hyperspectral data for identifying a marine object according to an embodiment of the present invention.

FIG. 2 is a network relationship diagram of a server and a client model of an apparatus for processing hyperspectral data for identifying a marine object according to an embodiment of the present invention.

Referring to FIG. 2, a method for processing hyperspectral data for identifying a marine object according to an embodiment of the present invention may be performed by an apparatus 100 for processing hyperspectral data for identifying a marine object.

A system 10 for processing hyperspectral data for identifying a marine object according to an embodiment of the present invention may be configured to include the apparatus 100 for processing the hyperspectral data for identifying the marine object corresponding to a server, a desktop 210 corresponding to a client which may be connected thereto via communication, a user terminal 220, and a network 300.

The apparatus 100 for processing the hyperspectral data for identifying the marine object may process the hyperspectral data by executing instructions including codes for the method for processing the hyperspectral data for identifying the marine object according to the embodiment of the present invention.

The desktop 210 may be connected to the apparatus 100 for processing the hyperspectral data for identifying the marine object via a wired network to control its operation.

The user terminal 220 may be connected to the apparatus 100 for processing the hyperspectral data for identifying the marine object via a wireless network to control its operation.

The network 300 may be any suitable communication network, including wired and wireless networks, such as serial communication, a local area network (LAN), a wide area network (WAN), Internet of TCP/IP, Intranet, and Extranet, and mobile networks, such as cellular, 3G, LTE, 5G, WiFi network, ad hoc network, and combinations thereof.

The network 300 may include connection of network elements such as hubs, bridges, routers, switches, and gateways. The network 300 may include one or more connected networks, for example, a multi-network environment, including a public network such as an internet and a private network such as a safe corporate private network. The access to the network 300 may be provided via one or more wired or wireless access networks.

Figure 3:
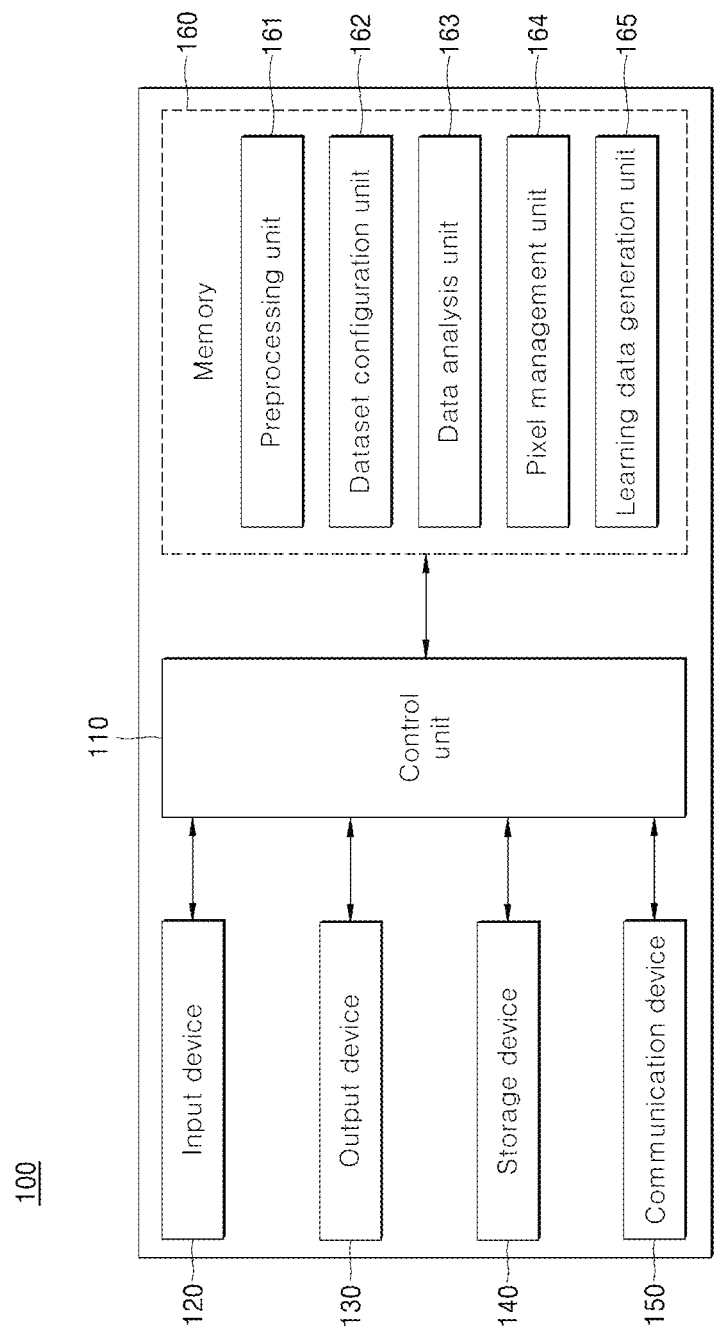
FIG. 3 is a block diagram of an apparatus for processing hyperspectral data for identifying a marine object according to an embodiment of the present invention.

FIG. 3 is a block diagram of an apparatus for processing hyperspectral data for identifying a marine object according to an embodiment of the present invention.

Referring to FIG. 3, the apparatus 100 for processing the hyperspectral data for identifying the marine object includes an input device 120, an output device 130, a storage device 140, a communication device 150 and a memory 160.

The memory 160 may be configured to include a pre-processing unit 161, a dataset configuration unit 162, a data analysis unit 163, a pixel management unit 164, and a learning data generation unit 165.

The pre-processing unit 161 has a pre-processing function of the hyperspectral data through interactions such as data transmission, storage, reception, interrupt call, and the like between the control unit 110, for example, a processor and the memory 160.

The dataset configuration unit 162 has a function of configuring a dataset using the hyperspectral data through interactions such as data transmission, storage, reception, interrupt call, and the like between the control unit 110, for example, a processor and the memory 160.

The data analysis unit 163 has a function of analyzing the hyperspectral data through interactions such as data transmission, storage, reception, interrupt call, and the like between the control unit 110, for example, a processor and the memory 160.

The pixel management unit 164 has a function of managing pixels extracted from the hyperspectral data through interactions such as data transmission, storage, reception, interrupt call, and the like between the control unit 110, for example, a processor and the memory 160.

The learning data generation unit 165 has a function of generating learning data of a marine object detection and identification model using the hyperspectral data through interactions such as data transmission, storage, reception, interrupt call, and the like between the control unit 110, for example, a processor and the memory 160.

Figure 4:
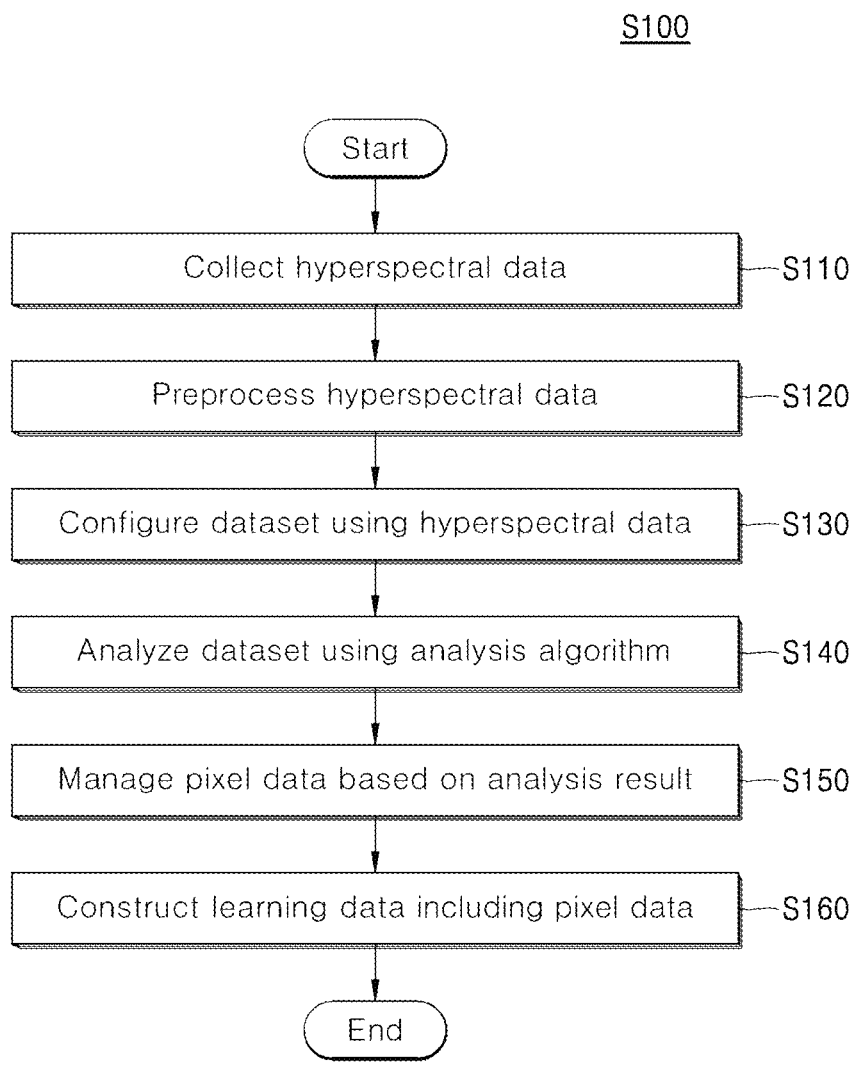
FIG. 4 is a flowchart of a method for analyzing hyperspectral data for identifying a marine object according to an embodiment of the present invention.

FIG. 4 is a flowchart of a method for processing hyperspectral data for identifying a marine object according to an embodiment of the present invention.

Referring to FIG. 4, a method (S100) for processing hyperspectral data for identifying a marine object according to an embodiment of the present invention may be configured to include collecting hyperspectral data (S110), pre-processing the hyperspectral data (S120), configuring a dataset using the hyperspectral data (S130), analyzing the dataset using an analysis algorithm (S140), managing pixel data based on an analysis result (S150), and constructing learning data including the pixel data (S160).

In step S110, the apparatus 100 for processing the hyperspectral data for identifying the marine object (hereinafter, a hyperspectral data processing apparatus) may collect hyperspectral data through marine photographing in which various objects to be used for learning an object identification model are shown. Here, the concept of the collection may include a "receiving" action. Accordingly, according to a user input, the hyperspectral data processing apparatus 100 may receive the hyperspectral data from various hyperspectral data sources connected to the network 300.

In step S120, the hyperspectral data processing apparatus 100 may pre-process the hyperspectral data. The hyperspectral data cannot always be collected in the presence of sufficient light because the quality thereof is sensitive to the altitude of the sun, the presence and amount of clouds, and changes in the weather at the time of collection. Accordingly, the collected hyperspectral data may be subjected to various corrections, for example, radiating correction, atmospheric correction, and geometric correction through the pre-processing process.

In step S130, the hyperspectral data processing apparatus 100 may configure a learning dataset for marine object identification using the hyperspectral data.

The hyperspectral data processing apparatus 100 may select a data file, set an analysis range of the data file, and convert the data file.

For example, the hyperspectral data processing apparatus 100 may visualize the hyperspectral data as an image by using data in a visible light area included in the hyperspectral data. For example, a rectangular range of two X-axis points and two Y-axis points may be set as an analysis area, and hyperspectral data of the selected area may be visualized. The reason for visualization includes increasing operation efficiency of a user. The hyperspectral data may be converted into a DMT image, an HIS image, a binary image, and the like for analysis. In addition, the hyperspectral data may be converted into an HDR image form to increase the range of brightness.

In step S140, the hyperspectral data processing apparatus 100 may analyze the dataset using an analysis algorithm. The analyzing of the dataset corresponds to a process for detection and identification of the marine object. The detection of the marine object means detecting the presence of a marine object, and the identification of the marine object means detecting the identity of the detected object. The analyzing of the data set will be described in detail with reference to FIG. 5.

Figure 5:
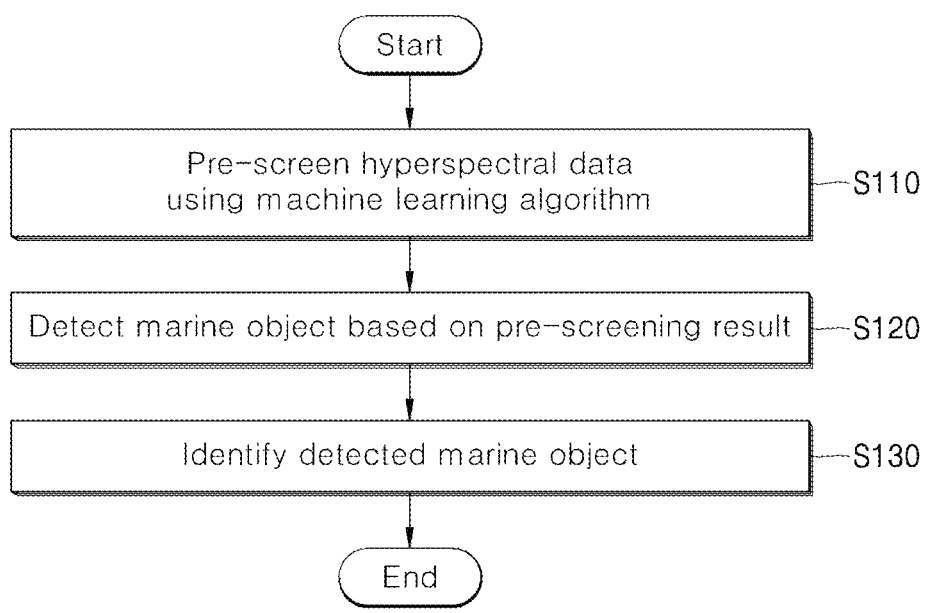
FIG. 5 is a flowchart of a method for processing hyperspectral data for identifying a marine object according to an embodiment of the present invention.

FIG. 5 is a flowchart of a method for analyzing hyperspectral data for identifying a marine object according to an embodiment of the present invention.

Referring to FIG. 5, the analyzing (S200) of the dataset according to the embodiment of the present invention may be configured to include a pre-screening the hyperspectral data using a machine learning algorithm (S210), detecting a marine object based on the pre-screening result (S220), and identifying the detected marine object (S230).

In step S210, the data processing apparatus 100 may pre-screen the hyperspectral data using the machine learning algorithm. In an embodiment of the present invention, a density-based clustering technique may be used for clustering of marine objects. In particular, as an embodiment of the present invention, a density-based spatial clustering of applications with noise (DBSCAN) algorithm may be used.

The hyperspectral data processing apparatus 100 may analyze the density of clusters while changing parameters with respect to the cluster formation of marine objects. For example, the hyperspectral data processing apparatus 100 may analyze the cluster density according to a change in eps parameter, which is a parameter of the HDSCAN with respect to the cluster formation. Depending on the cluster density, the marine object may or may not belong to a cluster and may be detected as noise. In addition, by adjusting a min samples parameter value corresponding to a minimum value belonging to the cluster, an arbitrary marine object may be included in the cluster or may also be treated as noise out of the cluster.

In addition, there are Cores and Scan Scale as parameters used in the embodiment of the present invention. The Cores is a parameter related to a machine learning analysis rate and controls the number of cores used by the CPU. The Scan Scale is a parameter that specifies the analysis size of hyperspectral data that may be analyzed at once.

In the DBSCAN method, the speed multiplies every time the number of pixels increases, whereas when the number of pixels is too low, an appropriate cluster cannot be formed. Although this parameter is a parameter related to the speed of machine learning, the parameter may be implemented in consideration of a situation in which aerial image data is divided and computed into real-time or semi-real-time in the future.

In step S220, the hyperspectral data processing apparatus 100 may detect the marine object based on the pre-screening result.

For example, the hyperspectral data processing apparatus 100 may remove data of the seawater area from the hyperspectral data based on the density of the marine object. The seawater may form one marine object in the hyperspectral data. Accordingly, the seawater corresponds to a cluster including the largest number of pixels only in so far as the seawater is treated as the marine object. Therefore, in order to identify an object, the hyperspectral data of the seawater area needs to be removed. Data on the most densely distributed seawater may be removed from marine hyperspectral data through density analysis.

In step S230, the hyperspectral data processing apparatus 100 may identify the detected marine object.

For example, the hyperspectral data processing apparatus 100 may detect noise formed by an object out of the cluster by using a clustering algorithm. In an embodiment of the present invention, pixels of an object included in the cluster may be displayed in white, and pixels of an object not included in the cluster may be displayed in black. Noise formed out of the cluster may be a subject.

The hyperspectral data processing apparatus 100 may identify a marine object based on coordinate values and a spectrum of pixels corresponding to noise. When analyzing the spectrum of the pixels in the noise area corresponding to the marine object, the pixels of the noise show a unique spectrum depending on a type of marine object, for example, a fishing boat, a life ring, a life buoy, and a life raft. Accordingly, the marine object may be identified based on the coordinate values and the spectrum of the pixels.

In step S150, the hyperspectral data processing apparatus 100 may manage the pixels constituting the object using the analysis result.

The hyperspectral data processing apparatus 100 may label pixels formed by the marine object. The hyperspectral data processed by the hyperspectral processing method S100 according to the embodiment of the present invention may be used for learning of a detection and identification model of detecting and identifying the marine object based on the machine learning algorithm. Accordingly, the detection and identification result of the marine object in the processing process may be stored in the pixels of the corresponding hyperspectral image through labeling.

In step S160, the hyperspectral data processing apparatus 100 may construct learning data using pixel data.

Here, the constructing of the learning data using the pixel data (S160) may be configured to include classifying the pixel data formed by the labeled marine object, and constructing an integrated library using the classified pixel data.

In addition, the hyperspectral data processing apparatus 100 may store a pixel spectrum in the integrated library. Accordingly, the integrated library may include coordinate value information of noise, identified marine object information, and pixel spectrum information for the hyperspectral data.

Hereinafter, an example screen of a UI of an application prepared to execute instructions including codes with respect to the method for processing hyperspectral data (S100) for identifying the marine object according to an embodiment of the present invention will be described.

Figure 6:
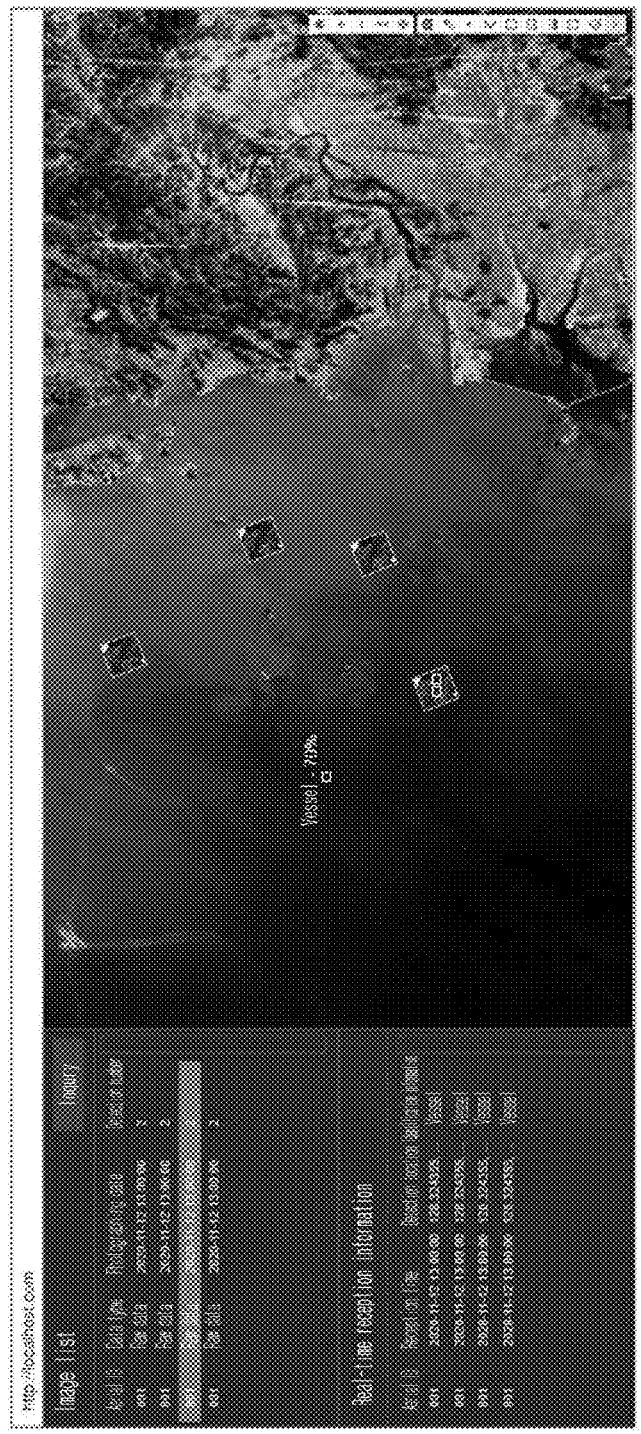
FIG. 6 is an example screen of an application UI implementing the method for processing hyperspectral data for identifying a marine object according to an embodiment of the present invention.

FIG. 6 is an example screen of an application UI implementing the method for processing hyperspectral data for identifying a marine object according to an embodiment of the present invention.

Referring to FIG. 6, hyperspectral data converted into a form that may be seen through the user's eyes is described. An image list represents a dataset according to an embodiment of the present invention. In addition, the real-time reception information represents reception information on hyperspectral data received by the hyperspectral processing apparatus 100.

Figure 7:
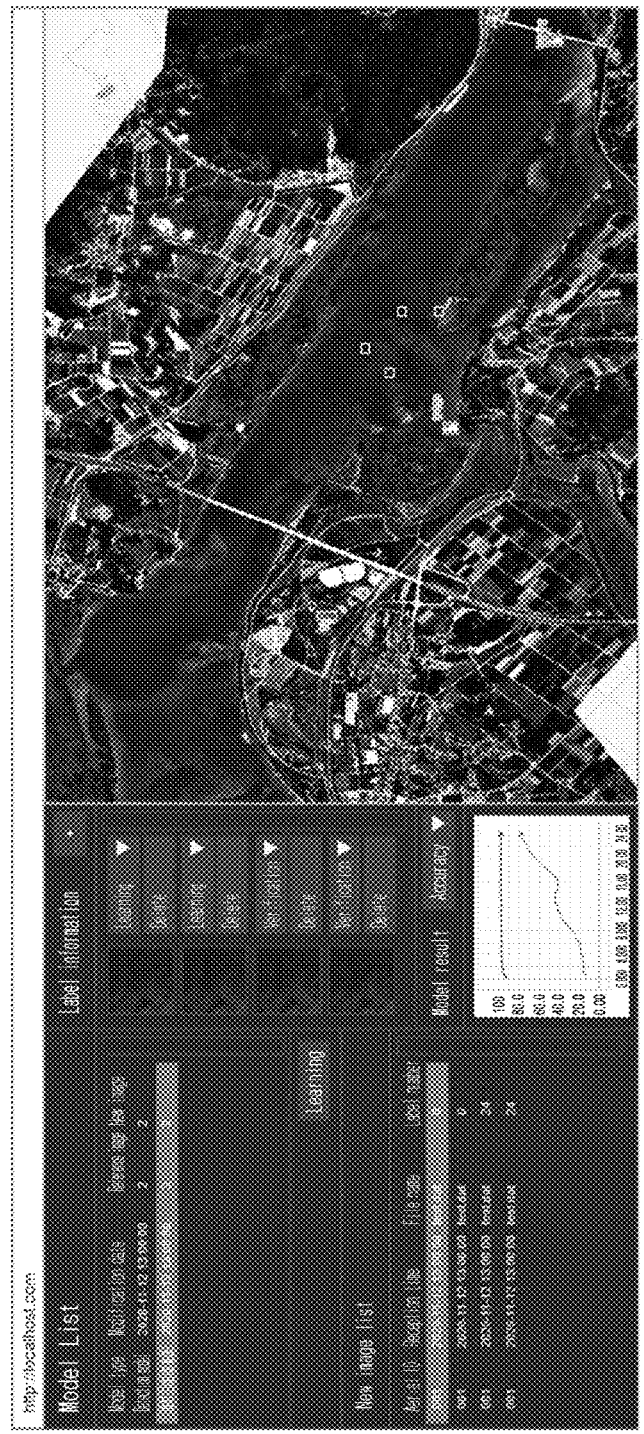
FIG. 7 is an example screen of an application UI implemented with the method for processing hyperspectral data for identifying a marine object according to an embodiment of the present invention.

FIG. 7 is an example screen of an application UI implemented with the method for processing hyperspectral data for identifying a marine object according to an embodiment of the present invention.

Referring to FIG. 7, the hyperspectral data according to an embodiment of the present invention may include the land as a subject. When the dataset is configured (S130), the hyperspectral data necessary for the operation is linked to the formed dataset. A coordinate side of an area to be analyzed is set, and for example, three bands are set in 127 bands of 400 nm to 900 nm, and a visualized image of the set area is displayed. Machine learning analysis is performed on the corresponding area, and in this case, EPS, Cores, and Scan Scale parameters may be set. The user may delete the dataset itself for further research using the UI, or remove only the learning data analyzed by machine learning.

Figure 8:
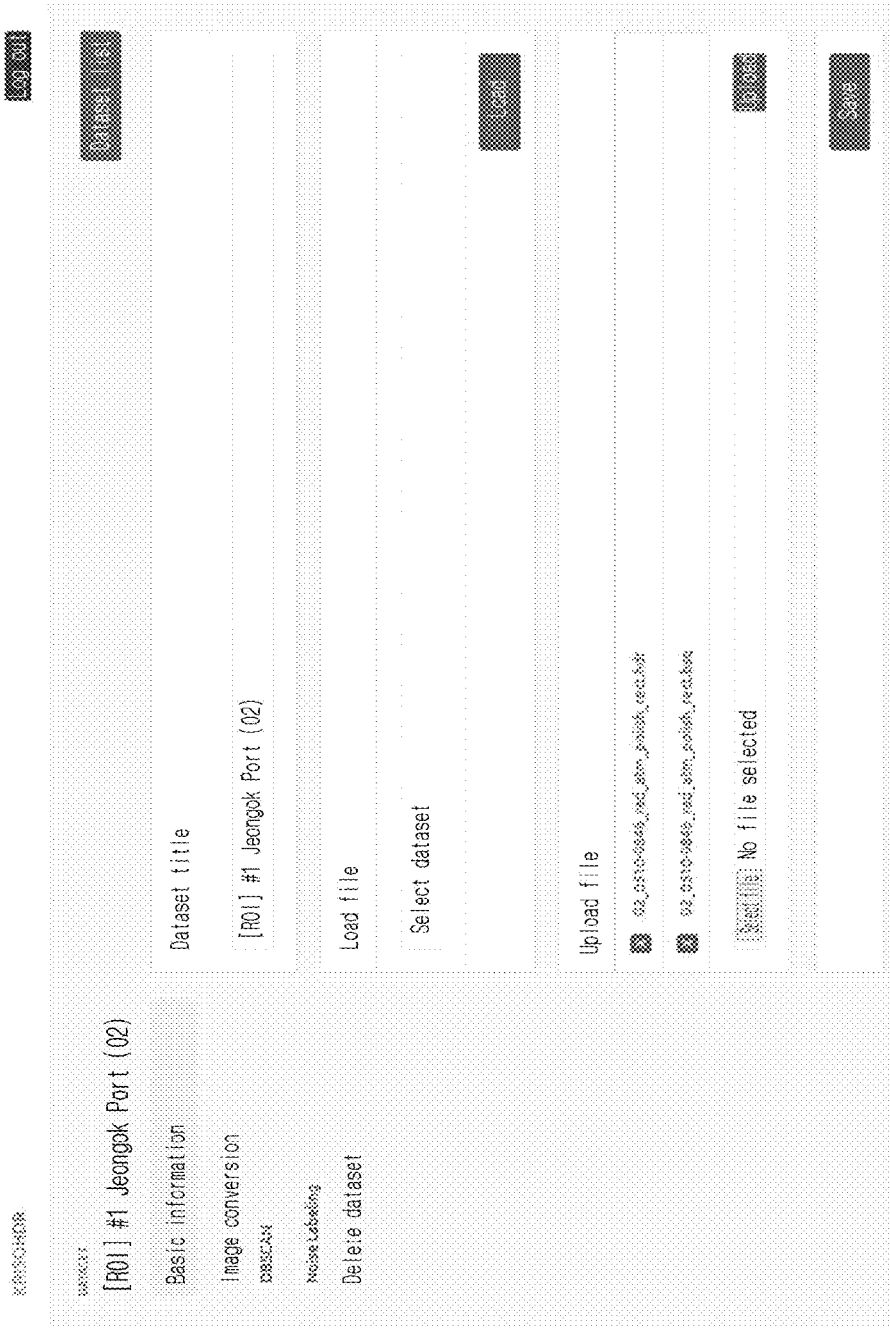
FIG. 8 is an example screen of an application UI for a dataset configuration in the method for processing hyperspectral data for identifying a marine object according to an embodiment of the present invention.

FIG. 8 is an example screen of an application UI for a dataset configuration in the method for processing hyperspectral data for identifying a marine object according to an embodiment of the present invention.

Referring to FIG. 8, processes such as registration of hyperspectral data, image conversion, and the like may be performed through the UI of the dataset configuration. FIG. 8 illustrates a dataset configuration using hyperspectral data collected in Jeongok Port.

Figure 9:
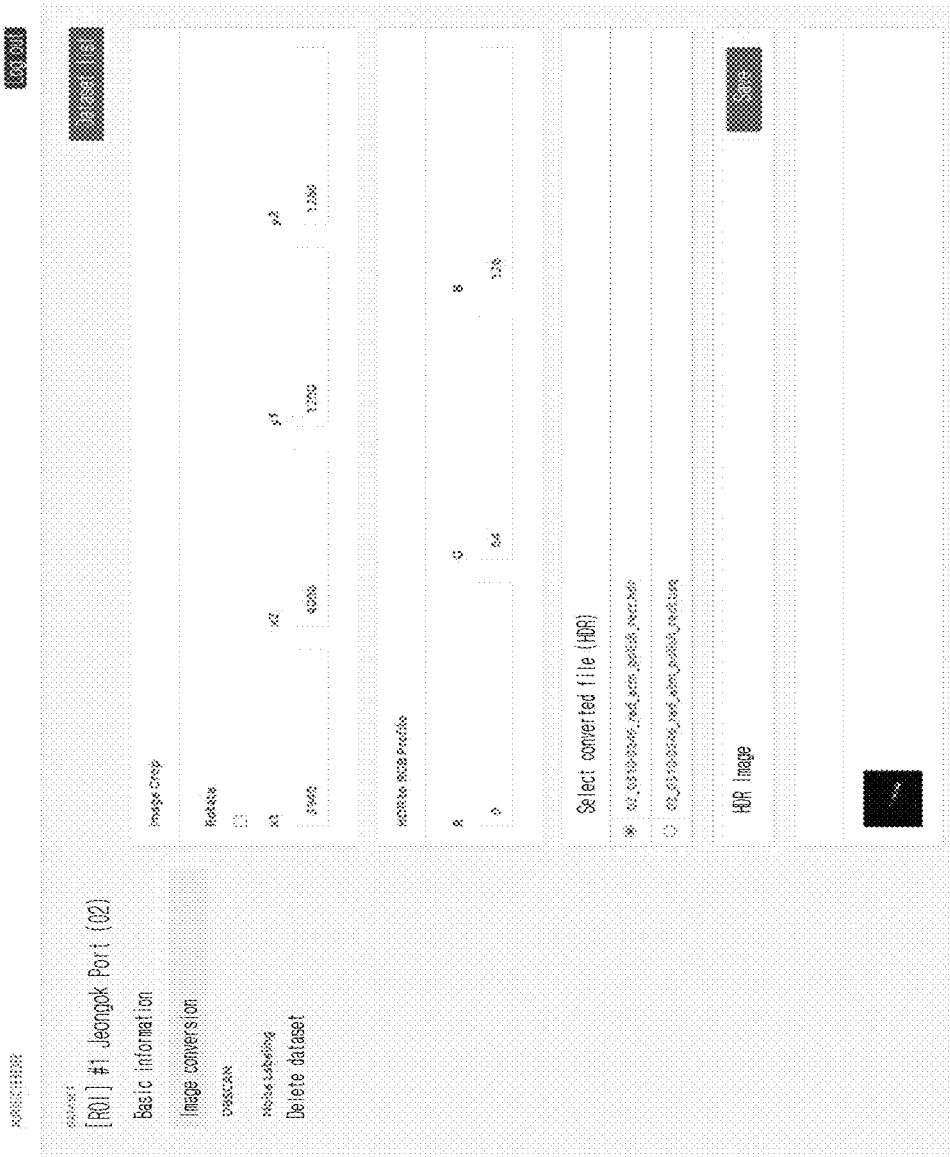
FIG. 9 is an example screen of an application UI for data conversion in the method for processing hyperspectral data for identifying a marine object according to an embodiment of the present invention.

FIG. 9 is an example screen of an application UI for data conversion in the method for processing hyperspectral data for identifying a marine object according to an embodiment of the present invention.

Referring to FIG. 9, a UI in an image conversion process of hyperspectral data is illustrated. In the hyperspectral data, a partial area may be used for analysis through a cropping operation. The analysis area may be illustrated with two-point X-axis coordinate and Y-axis coordinate values. The user may display a RGB image in a HDR image location through the menu of the UI.

Figure 10:
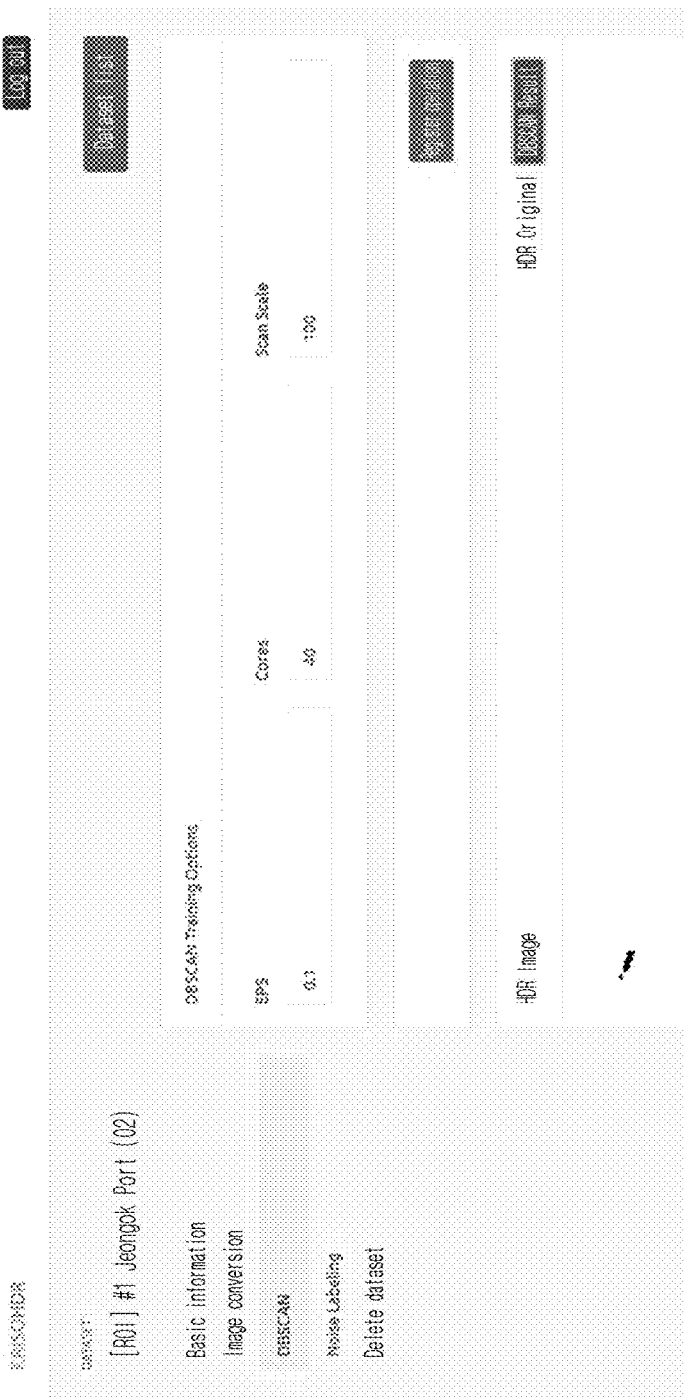
FIG. 10 is an example screen of an application UI for data analysis in the method for processing hyperspectral data for identifying a marine object according to an embodiment of the present invention.

FIG. 10 is an example screen of an application UI for data analysis in the method for processing hyperspectral data for identifying a marine object according to an embodiment of the present invention.

Referring to FIG. 10, a UI related to designation of parameters of the machine learning algorithm used for analysis of hyperspectral data according to an embodiment of the present invention is depicted. It can be seen that EPS is designated to 0.1, Cores is designated to 40, and Scan Scale is designated to 100, respectively.

Figure 11:
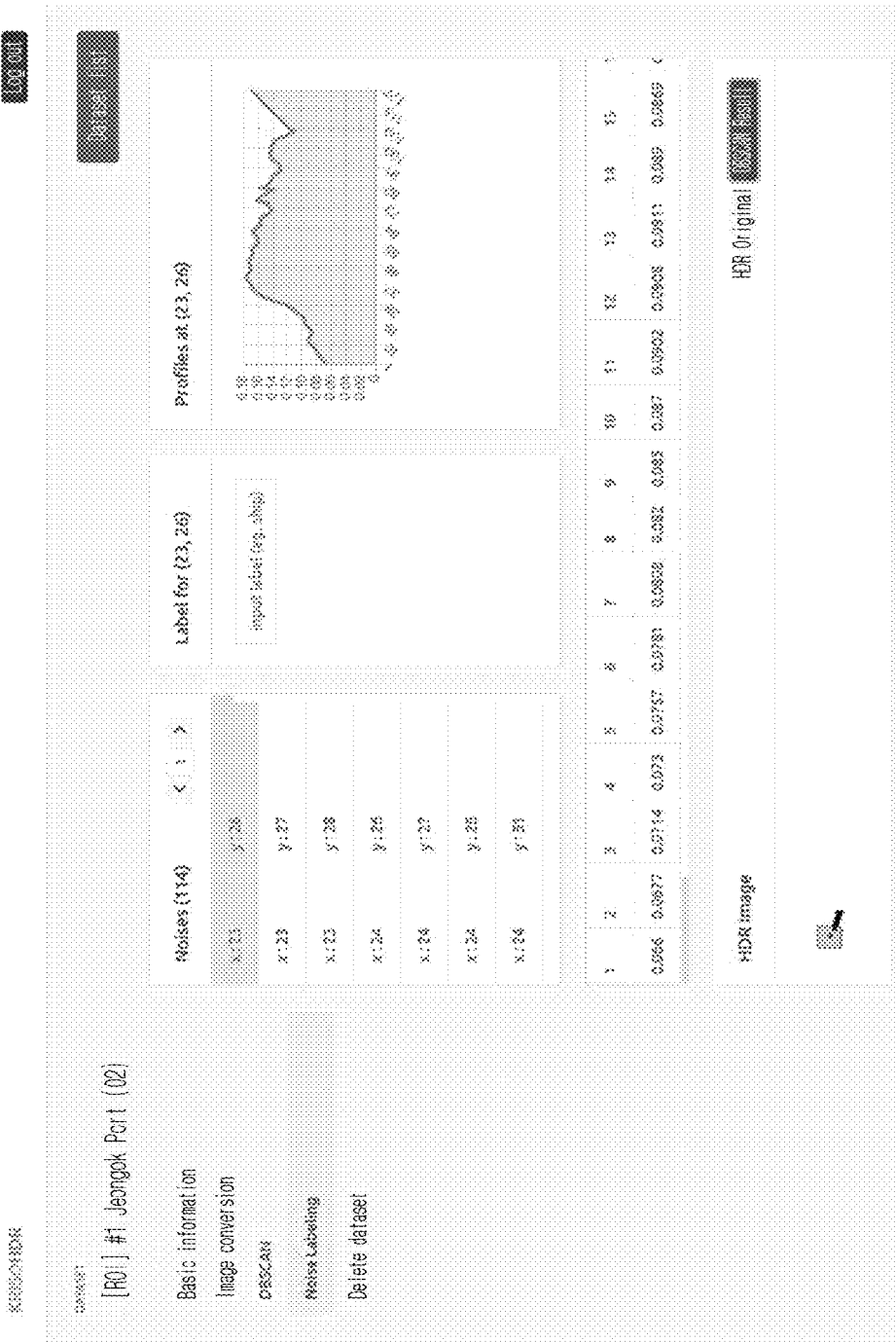
FIG. 11 is an example screen of an application UI for results of data analysis in the method for processing hyperspectral data for identifying a marine object according to an embodiment of the present invention.

FIG. 11 is an example screen of an application UI for results of data analysis in the method for processing hyperspectral data for identifying a marine object according to an embodiment of the present invention.

Referring to FIG. 11, the analysis result of the hyperspectral data collected in Jeongok Port is illustrated. Coordinates for noise are detected, and the user may perform labeling on the detected noise by referring to the spectrum information.

Figure 12:
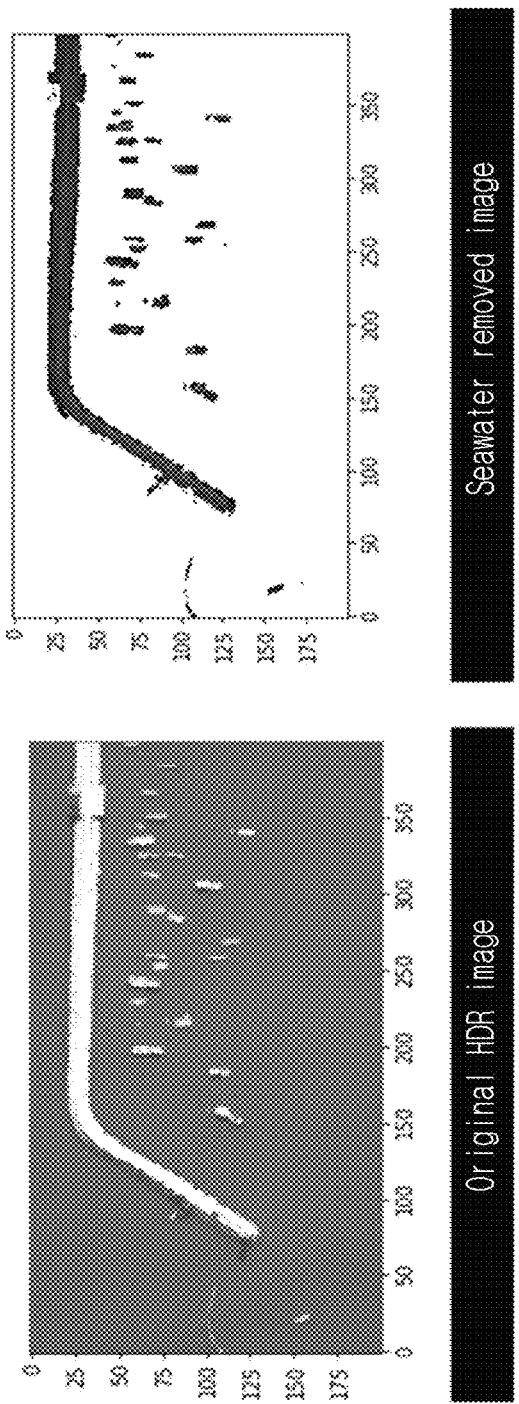
FIG. 12 is an example screen of an application UI for marine object detection in the method for processing hyperspectral data for identifying a marine object according to an embodiment of the present invention.

FIG. 12 is an example screen of an application UI for marine object detection in the method for processing hyperspectral data for identifying a marine object according to an embodiment of the present invention.

Referring to FIG. 12, a seawater removing process using the hyperspectral data in the marine object detecting process is illustrated. A left image is an image in which the seawater is expressed, and a right image is an image in which the seawater is removed.

Figure 13:
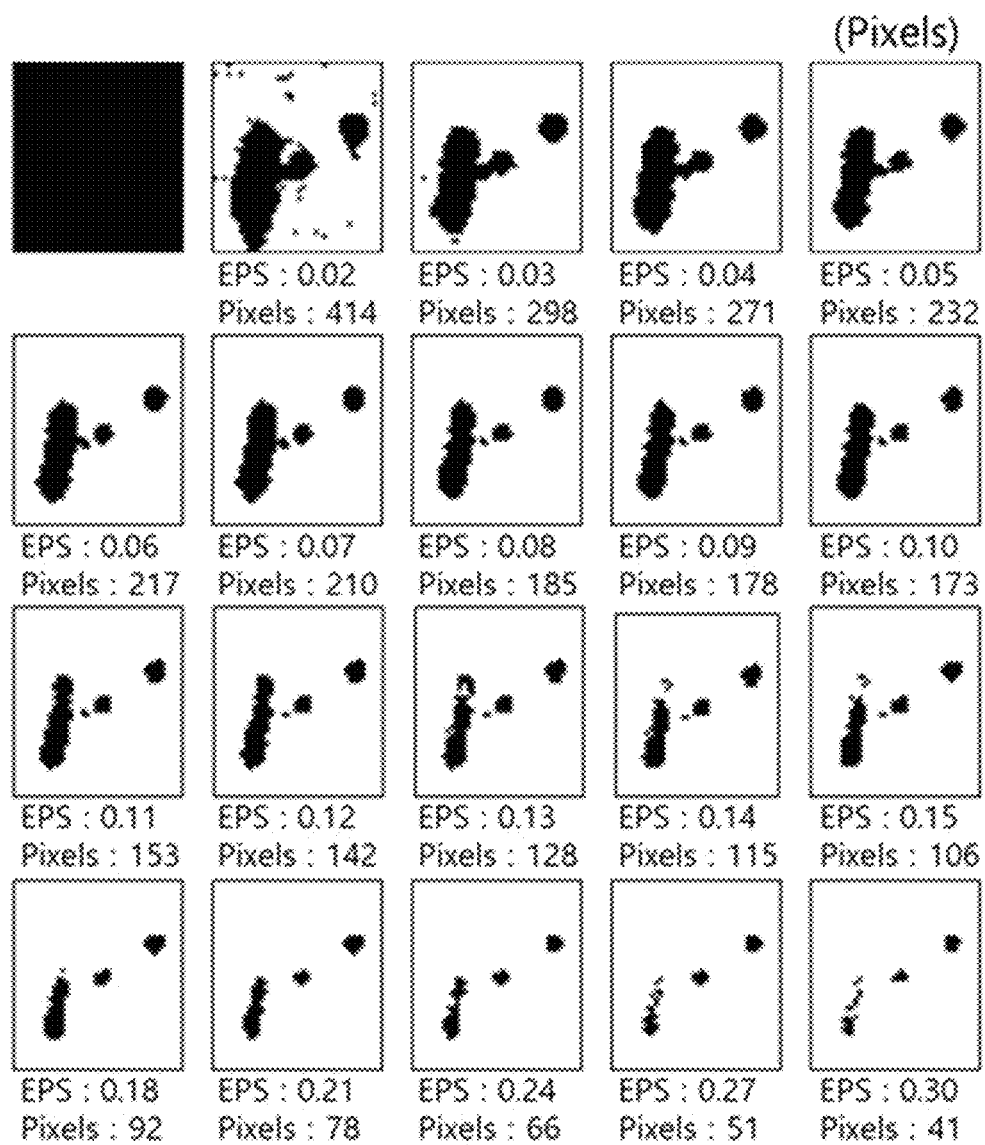
FIG. 13 is an example screen of an application UI for a marine object detection rate in the method for processing hyperspectral data for identifying a marine object according to an embodiment of the present invention.

FIG. 13 is an example screen of an application UI for a marine object detection rate in the method for processing hyperspectral data for identifying a marine object according to an embodiment of the present invention.

Referring to FIG. 13, pixel distribution of a marine object shown as noise on a binary image is shown according to the hyperspectral data analysis result. The distribution of pixels is differently shown depending on a specified EPS parameter value. The number of pixels may be analyzed while changing the value of the EPS parameter of DBSCAN from 0.01 to 0.03. As the EPS increases, the number of pixels detected through DBSCAN decreases.

Figure 14:
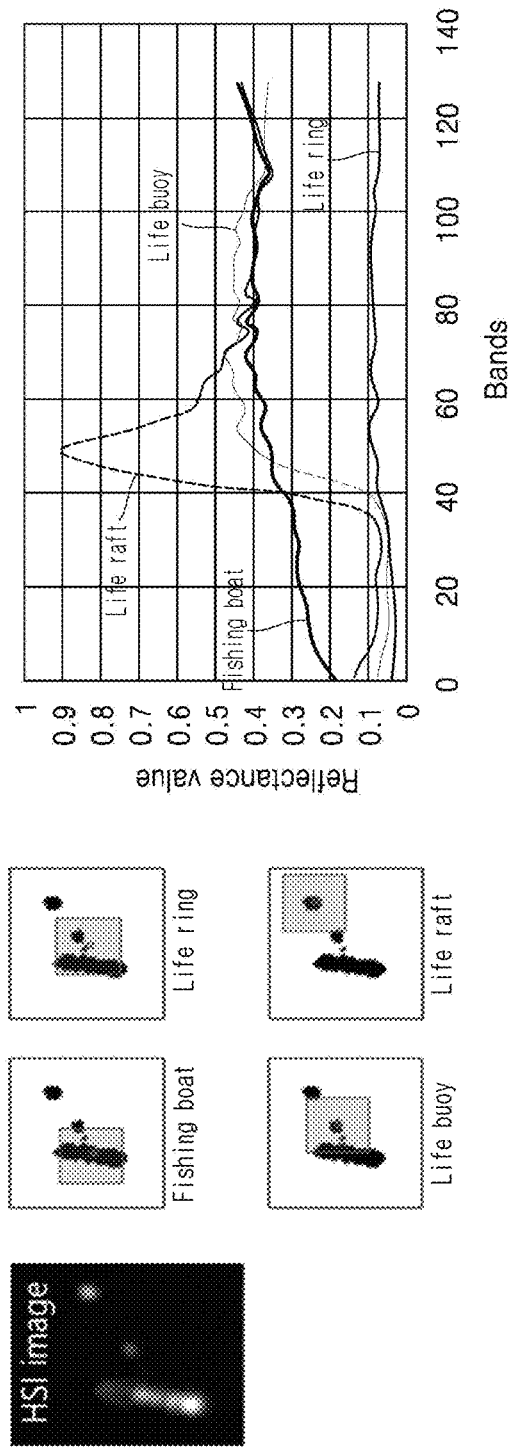
FIG. 14 is an example screen of an application UI for marine object identification in the method for processing hyperspectral data for identifying a marine object according to an embodiment of the present invention.

FIG. 14 is an example screen of an application UI for marine object identification in the method for processing hyperspectral data for identifying a marine object according to an embodiment of the present invention.

Referring to FIG. 14, a spectrum distribution of pixels constituting a fishing boat, a life ring, a life buoy, and a life raft classified as noise among marine objects is illustrated. Since the marine object has a unique spectrum according to its type, it is possible to identify a marine object based thereon.

As described above, according to the present invention, it is possible to train a learning model for identifying a marine object based on hyperspectral data using a constructed learning data.

In addition, it is possible to reduce the time required for identifying marine objects compared to seawater by using hyperspectral data, and also increase an identification rate.

In addition, according to the accumulation of the hyperspectral data, it is possible to learn and relearn a hyperspectral data-based marine object recognition model that recognizes marine objects shown as noise in machine learning clustering.

As described above, although several preferred embodiments of the present invention have been described with some examples, the descriptions of various exemplary embodiments described in the "detailed description for implementing the Invention" item are merely exemplary, and it will be appreciated by those skilled in the art that the present invention can be variously modified and carried out or equivalent executions to the present invention can be performed from the above description.

In addition, since the present invention can be implemented in various other forms, the present invention is not limited by the above description, and the above description is for the purpose of completing the disclosure of the present invention, and the above description is just provided to completely inform those skilled in the art of the scope of the present invention, and it should be known that the present invention is only defined by each of the claims.

INDUSTRIAL APPLICABILITY

According to the present invention, it is possible to train a learning model for identifying a marine object based on hyperspectral data using constructed learning data.

The invention claimed is:

1. A method for processing hyperspectral data performed by an apparatus for processing hyperspectral data for identifying a marine object, the method comprising:
configuring a learning dataset for identifying a marine object using hyperspectral data;
analyzing the dataset using an analysis algorithm;
managing pixels constituting the object using the analysis result; and
constructing learning data using pixel data,
wherein the analyzing of the dataset comprises pre-screening the hyperspectral data using a machine learning algorithm;
detecting a marine object based on the pre-screening result; and
identifying the detected marine object,
wherein the identifying of the detected marine object comprises detecting noise formed by an object out of a cluster using a clustering algorithm; and
identifying the marine object based on coordinate values and a spectrum of pixels corresponding to the noise,
wherein the spectrum of the pixels in a noise area corresponding to the marine object is configured to show a unique spectrum according to a type of marine object;
wherein the processing hyperspectral data comprises collecting hyperspectral data through marine photographing in which various objects to be used for learning an object identification model are shown;
wherein the pre-screening comprises analyzing a density of a cluster while changing parameters for the formation of a marine object cluster;
wherein the constructing of the learning data comprises classifying pixel data formed by a labeled marine object; and
constructing an integrated library using the classified pixel data.

2. The method for processing the hyperspectral data of claim 1, further comprising:
preprocessing the hyperspectral data.

3. The method for processing the hyperspectral data of claim 1, wherein the configuring of the dataset comprises selecting a data file, setting an analysis range of the data file, and converting the data file.

4. The method for processing the hyperspectral data of claim 1, wherein the detecting of the marine object comprises removing data of a seawater area from the hyperspectral data based on the density of the marine object.

5. The method for processing the hyperspectral data of claim 1, wherein the managing of the pixels comprises labeling pixels formed by the marine object.

6. The method for processing the hyperspectral data of claim 1, wherein the constructing of the learning data comprises storing a pixel spectrum in an integrated library.

7. The method for processing the hyperspectral data of claim 1, further comprising:
visualizing the hyperspectral data as an image using data in a visual light area included in the hyperspectral data.

8. An apparatus for processing hyperspectral data comprising:
a dataset for configuring a learning dataset for identifying a marine object using hyperspectral data;
a data for analyzing the dataset using an analysis algorithm;
a pixel for managing pixels constituting the object using the analysis result; and
a learning data for generating and constructing learning data using pixel data,
wherein the data for analyzing is configured to pre-screen the hyperspectral data using a machine learning algorithm,
detect a marine object based on the pre-screening result,
identify the detected marine object,
detect noise formed by an object out of a cluster using a clustering algorithm when identifying the marine object, and
identify the marine object based on coordinate values and a spectrum of pixels corresponding to the noise,
wherein the spectrum of the pixels in a noise area corresponding to the marine object is configured to show a unique spectrum according to a type of marine object,
wherein the processing hyperspectral data comprises collecting hyperspectral data through marine photographing in which various objects to be used for learning an object identification model are shown;

wherein the pre-screening further comprises analyzing a density of a cluster while changing parameters for the formation of a marine object cluster;
wherein the constructing learning data further comprises classifying pixel data formed by the labeled marine object; and
constructing an integrated library using the classified pixel data.

\* \* \* \* \*